United States Patent [19]

Azuma et al.

[11] 4,124,543

[45] Nov. 7, 1978

[54] ANTI-STATIC AGENT COMPOSITION

[75] Inventors: Minoru Azuma, Osaka; Junichi Tamura; Zenichi Mori, both of Wakayama, all of Japan

[73] Assignee: Kao Soap Company, Tokyo, Japan

[21] Appl. No.: 883,926

[22] Filed: Mar. 6, 1978

[30] Foreign Application Priority Data
Mar. 11, 1977 [JP] Japan .............................. 52-27506

[51] Int. Cl.$^2$ ........................................... D06M 13/20
[52] U.S. Cl. ...................................... 252/8.6; 8/115.6
[58] Field of Search ......................... 252/8.6; 8/115.6

[56] References Cited

U.S. PATENT DOCUMENTS

| | | | |
|---|---|---|---|
| 2,086,590 | 7/1937 | Whitehead | 252/8.6 |
| 2,735,790 | 2/1956 | Waitkus | 252/8.8 |
| 3,113,369 | 12/1963 | Barrett et al. | 252/8.6 |
| 3,928,212 | 12/1975 | Goto et al. | 252/8.6 |

Primary Examiner—William E. Schulz

[57] ABSTRACT

A liquid anti-static agent composition which is applied to the surface of synthetic resin was disclosed. The anti-static agent composition consists essentially of: (1) sucrose ester, (2) glycerin ester, (3) polyol, and (4) water.

7 Claims, No Drawings

ANTI-STATIC AGENT COMPOSITION

FIELD OF THE INVENTION

The present invention relates to an anti-static agent composition for synthetic resin, especially to a liquid anti-static agent composition which is applied to the surface of synthetic resin. The anti-static agent composition consists essentially of (1) sucrose ester, (2) glycerin ester, (3) polyol, and (4) water.

BACKGROUND OF THE INVENTION

Two known methods to give synthetic resin anti-static character are mixing of an anti-static agent in the resin by kneading and applying an anti-static agent to the surface of the resin. Because the former is not effective for polystyrene resin, ABS or melamine resin, the latter is generally adopted for these resins. The anti-static agent which is used in the latter method is called an external anti-static agent. Surfactants are generally used as an external anti-static agent. The anti-static agent which is applied to the resin used for food packaging should be suitable for ingestion and excellent in supplying anti-static character.

SUMMARY OF THE INVENTION

The present invention provides an excellent anti-static agent composition which is a special combination of specified materials.

In accordance with the present invention, an aqueous liquid anti-static agent composition which is applied to the surface of synthetic resin, consisting essentially of: (1) sucrose ester, (2) glycerin ester, (3) polyol, and (4) water is prepared. The preferred aqueous liquid anti-static agent composition of the present invention consists essentially of:

(1) from 5 to 20 parts by weight of sucrose ester
(2) from 4 to 20 parts by weight of glycerin ester
(3) from 10 to 30 parts by weight of polyol
(4) enough water to make a total composition of at least 100 parts by weight.

DESCRIPTION OF THE PREFERRED EMBODIMENT

As described, the essential ingredients of the present invention are (1) sucrose ester, (2) glycerin ester, (3) polyol, and (4) water.

SUCROSE ESTER

The sucrose esters which may be employed in accordance with the present invention are esters from sucrose and organic acids. They include, for example, mono- and diesters from sucrose and organic acids.

The organic acids which may be employed in accordance with the present invention to form sucrose ester, include those which have one or more hydrocarbon radicals or substituted hydrocarbon radicals and one or more acid groups which will form salts with sodium hydroxide. Those organic acids include carboxylic acids and alkylphosphoric acids. The preferred organic acids are saturated or unsaturated monocarboxylic acids having from 8 to 18 carbon atoms in the molecule. These monocarboxylic acids include fatty acids, for example, caprylic acid, capric acid, lauric acid, myristic acid, palmitic acid, stearic acid, oleic acid, and linoleic acid.

Sucrose esters are generally obtained in a mixture containing sucrose, free acid, monoester, diester, triester tetraester and other higher esters, when sucrose is reacted with organic acids or derivatives thereof. Usually, sucrose esters used in accordance with the present invention contain at least about 70 wt.% of monoester, diester or a mixture thereof. The preferred sucrose ester of the present invention is a mixture containing mono- and diester obtained from sucrose and saturated or unsaturated mono-carboxylic acid having from 8 to 18 carbon atoms. A typical example of the preferred sucrose ester of the present invention is a mixture containing 60 to 80 wt.% monoester and 10 to 30 wt.% diester from sucrose and fatty acid having from 12 to 18 carbon atoms.

GLYCERIN ESTER

The glycerin esters which may be employed in accordance with the present invention include mono- and diesters from glycerin and organic acids. The organic acids which are cited above may be used to form glycerin esters. The preferred organic acids are carboxylic acids, and alkylphosphoric acids. The more preferred organic acids are saturated or unsaturated monocarboxylic acids having from 8 to 18 carbon atoms in the molecule. These mono-carboxylic acids include such fatty acids, for example, caprylic acid, capric acid, lauric acid, myristic acid, palmitic acid, stearic acid, oleic acid and linoleic acid. The preferred glycerin esters are glycerin monoesters of saturated or unsaturated monocarboxylic acid having from 8 to 18 carbon atoms in the molecule. The most preferred glycerin esters are glycerin monoesters of saturated or unsaturated fatty acids having from 8 to 18 carbon atoms in the molecule. Glycerine esters may be prepared by reacting glycerin with organic acids or derivatives thereof, or hydrolyzing oil and fat, for example, coconut oil and tallow. Generally these glycerin esters are mixtures containing monoester, diester, triester, glycerin and free acid. Preferably glycerin ester of the present invention contains at least 60% of monoester. A typical preferred example of glycerin ester contains 70 to 90% of monoester.

POLYOL

The polyols which may be employed in accordance with the present invention include those which have at least two hydroxyl groups in the molecule, as well as oligomers and polymers, thereof. The preferred polyols have molecular weights of from 62 to 10,000. The more preferred examples of such polyols are: ethylene glycol; polyethylene glycol; glycerin; propylene glycol; sorbitol; mannitol; sorbitan; polyvinyl alcohol; and polyglycerin. The most preferred polyols are: glycerin, propylene glycol and sorbitol.

As previously disclosed, the contents of the essential ingredients of the present invention are:

(1) from 5 to 20 parts by weight of sucrose ester
(2) from 4 to 20 parts by weight of glycerin ester
(3) from 10 to 30 parts by weight of polyol
(4) enough water to make a total composition of at least 100 parts by weight.

If the content of an ingredient other than water is more than the highest limit, frequently uniform phase cannot be obtained. Due to the cost of transportation, it is economically desirable to make a highly concentrated solution as a commercial product. However, water may be included in excess, if a diluted product is strongly desired.

Other ingredients which are useful as ingredients of external anti-static agent compositions may be included provided that they cause no unfavorable effects on the composition of the present invention. These ingredients include neutralizing agents and buffers, for example, alkali metal pyrophosphate, alkali metal phosphate, and phosphoric acid. They can be included up to 5 wt.% in the composition.

The method used to prepare the liquid anti-static agent composition of the present invention is also important. Other methods than those described below, will frequently cause phase separation and give no uniform phase.

One preferred method is that a mixture of a portion of polyol and glycerin ester is combined with an aqueous solution of sucrose ester, then the rest of polyol and the rest of water are added to the combined mixture.

The other preferred method is that a portion of water is mixed with the mixture of sucrose ester, glycerin ester and a portion of polyol, then the rest of the polyol and the rest of the water are added successively to the mixture.

The aqueous liquid anti-static agent composition of the present invention can be applied to the surface of synthetic resin by any methods which are known to the person skilled in the art, as the method to apply the liquid external anti-static agent composition. The aqueous liquid anti-static agent composition, itself or as a diluted solution, may be applied to the surface of synthetic resin. Such methods include, for example, wiping the surface of synthetic resin with a cloth soaked in the liquid anti-static agent composition or the diluted solution thereof spraying the liquid anti-static agent composition or the diluted solution thereof, dipping the synthetic resin in the liquid anti-static agent composition or the diluted solution thereof. The solvent which may be employed to form a diluted solution of the liquid anti-static agent composition includes water and ethanol.

The liquid anti-static agent composition of the present invention may be applied to any kind of synthetic resin including thermo-plastic resins and thermo-set resins. The anti-static agent composition of the present invention is particularly effective on polystyrene resin, melamine resin, ABS, polyethylene resin, polypropylene resin and polyacrylate.

As the liquid anti-static agent composition of the present invention contains a considerable amount of water, this is safer for a person working with this composition than in the case with many organic solvents.

In order to be understood more readily, the following examples are set forth primarily for the purpose of illustration. All parts in examples are by weight.

EXAMPLE 1

A mixture of 20 parts of sucrose oleate (70% of monoester, 20% of diester) and 30 parts of water was prepared. Another mixture was prepared from 20 parts of glyceryl caprylate (75% of monoester), and 20 parts of propylene glycol. The two mixtures were combined. To make the total 100 parts of the mixture, 1.5 parts of potassium pyrophosphate, 0.35 parts of 85% phosphoric acid and the balance of water were added to the combined mixture. A semi-transparent composition, having uniform phase, was obtained.

EXAMPLE 2

Fifty parts of mixture was prepared from 5 parts of sucrose oleate, (70% of monoester, 20% of diester), 4 parts of caprylic acid monoglyceride, 6 parts of propylene glycol, 1 part of glycerin and the balance of water.

To this mixture were added 0.5 parts of potassium pyrophosphate, 0.1 parts of 85% phosphoric acid, to make the composition neutral, and 3 parts of sorbitol. Then, water was added to make the total of 100 parts. The prepared composition had a transparent uniform phase.

EXAMPLE 3

Forty parts of mixture was prepared from 20 parts of sucrose laurate (70% of monoester, 20% of diester) and 20 parts of water. Ten parts of glyceryl caprate (75% of monoester) and 15 parts of propylene glycol were added separately to the mixture. Then, 4 parts of potassium pyrophosphate, 0.75 parts of 85% phosphoric acid, 15 parts of sorbitol and the balance of water to make the total 100 parts were added. The prepared composition had a transparent uniform phase.

EXAMPLE 4

The performance of the liquid anti-static agent composition was tested by the following manner:

The composition prepared in Example (1) was diluted with ethanol to concentrations shown in the following table. For example, one part of the product of Example 1 including water is dissolved in 999 parts of ethanol to prepare 0.1% solution. The solution was sprayed on the resin surface until the surface got completely wet. After being air-dried, the half-life of anti-static character was measured with static honestometer made by Shishido Shokai Company. The test resin film of 3cm × 4cm was electrically charged at the voltage of 10,000 volts, then, the time was measured in which the electric charge reduced to the half of the intial one (half-life). If the half-life is less than 30 seconds, the anti-static character is enough. The results (half-life : second) were shown in the following table:

| Resin | Concentration (%) 0 | 0.1 | 0.5 |
|---|---|---|---|
| Polypropylene Film | more than 60 | 10 | 1 |
| Polyethylene Film | more than 60 | 7 | 1 |

EXAMPLE 5

Gauze was soaked in the liquid composition prepared in Example 2. Then, a cup on the market made of melamine resin was wiped with the gauze. After being air-dried the performance of the anti-static agent composition was tested by the same manner as in Example 4. Results (half-life : seconds) were as follows:
Untreated Cup 60
Treated Cup 5

EXAMPLE 6

The composition prepared in Example 3 was dissolved in water to concentrations shown in the following table by the same manner as in Example 4. The test resins were dipped in the solution. After being air-dried, the performance of the anti-static agent composition was tested by the same manner as in Example 4. Results (half-life : seconds) were as follows:

| Resin | Concentration (%) 0 | 0.5 | 1.0 |
|---|---|---|---|
| Polyacrylate | more than | | |

-continued

| Resin | Concentration (%) | | |
|---|---|---|---|
| | 0 | 0.5 | 1.0 |
| ABS | 60 more than 60 | 10 9 | 1.0 1 |

What is claimed is:

1. An aqueous liquid anti-static agent composition for application to the surface of synthetic resin, consisting essentially of:
   (a) from 5 to 20 parts by weight of mono- or diester from sucrose and an organic acid having one or more hydrocarbon radicals;
   (b) from 4 to 20 parts by weight of mono- or diester from glycerin and an organic acid having one or more hydrocarbon radicals;
   (c) from 10 to 30 parts by weight of polyol having molecular weight of from 62 to 10,000;
   (d) enough water to make a total composition of at least 100 parts by weight.

2. An aqueous liquid anti-static agent composition according to claim 1, in which said mono- or diester from sucrose and an organic acid is a mono- or diester from sucrose and a saturated or unsaturated monocarboxylic acid having from 8 to 18 carbon atoms.

3. An aqueous liquid anti-static agent composition according to claim 2, in which said monocarboxylic acid is a fatty acid.

4. An aqueous liquid anti-static agent composition according to claim 1, in which said mono- or diester from glycerin and an organic acid is a monoester from glycerin and a saturated or unsaturated monocarboxylic acid having from 8 to 18 carbon atoms.

5. An aqueous liquid anti-static agent composition according to claim 4, in which said monocarboxylic acid is a fatty acid.

6. An aqueous liquid anti-static agent composition according to claim 1, in which;
   (a) said mono- or diester from sucrose and an organic acid is a mixture of mono- and diester from sucrose and saturated or unsaturated fatty acid having from 8 to 18 carbon atoms;
   (b) said mono- or diester from glycerin and an organic acid is a glycerin monoester of saturated or unsaturated fatty acid having from 8 to 18 carbon atoms;
   (c) said polyol is a member selected from the group consisting of glycerin, sorbitol and propylene glycol.

7. An aqueous liquid anti-static agent composition according to claim 6, in which said mixture of mono- or diester from sucrose is a mixture containing 60 to 80 wt.% of monoester and 10 to 30 wt.% of diester from sucrose and fatty acid having from 12 to 18 carbon atoms.

* * * * *

UNITED STATES PATENT AND TRADEMARK OFFICE
CERTIFICATE OF CORRECTION

PATENT NO. : 4,124,543
DATED : November 7, 1978
INVENTOR(S) : Minoru Azuma, Junichi Tamura, Zenichi Mori It is certified that error appears in the above-identified patent and that said Letters Patent are hereby corrected as shown below:

Delete the table appearing at column 4, line 65 through line 5, column 5 and substitute therefore:

| Resin \ Concentration (%) | 0 | 0.5 | 1.0 |
|---|---|---|---|
| Polyacrylate | more than 60 | 10 | 1.0 |
| ABS | more than 60 | 9 | 1 |

Signed and Sealed this

Second Day of October 1979

[SEAL]

Attest:

RUTH C. MASON
Attesting Officer

LUTRELLE F. PARKER
Acting Commissioner of Patents and Trademarks